United States Patent
Yamashita

(10) Patent No.: US 9,448,817 B2
(45) Date of Patent: Sep. 20, 2016

(54) INFORMATION PROCESSING APPARATUS THAT SAVES DATA IN MAIN STORAGE DEVICE AND CONTROL METHOD THEREFOR, AND STORAGE MEDIUM

(71) Applicant: CANON KABUSHIKI KAISHA, Tokyo (JP)

(72) Inventor: Takahiro Yamashita, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 118 days.

(21) Appl. No.: 14/546,066

(22) Filed: Nov. 18, 2014

(65) Prior Publication Data

US 2015/0143097 A1 May 21, 2015

(30) Foreign Application Priority Data

Nov. 21, 2013 (JP) .................................. 2013-241100

(51) Int. Cl.
*G06F 15/177* (2006.01)
*G06F 9/445* (2006.01)

(52) U.S. Cl.
CPC ................................. *G06F 9/44505* (2013.01)

(58) Field of Classification Search
CPC .......................... G06F 11/1446; G06F 9/4401
USPC .......................................................... 713/2
See application file for complete search history.

(56) References Cited

U.S. PATENT DOCUMENTS

| | | | |
|---|---|---|---|
| 2004/0044890 A1* | 3/2004 | Lim | G06F 9/4406 713/2 |
| 2012/0191964 A1* | 7/2012 | Lee | G06F 11/2284 713/2 |
| 2013/0145076 A1* | 6/2013 | Chiueh | G06F 11/1417 711/103 |
| 2015/0143097 A1* | 5/2015 | Yamashita | G06F 9/44505 713/2 |

FOREIGN PATENT DOCUMENTS

JP        2011257987 A    12/2011

* cited by examiner

*Primary Examiner* — Vincent Tran
(74) *Attorney, Agent, or Firm* — Rossi, Kimms & McDowell LLP

(57) ABSTRACT

An information processing apparatus that can flexibly change an amount of data to be saved. A determining unit determines, at a time when the information processing apparatus is started up, whether termination processing has abnormally ended last-time or not. A detecting unit detects an instruction indicating processing that should be performed at the time of the start-up when the determining unit determines that the termination processing has abnormally ended last-time. A saving unit saves, under the instruction detected by the detecting unit, data stored in a save area determined by the instruction from among storage areas of a nonvolatile main storage device, to a save destination determined by the instruction.

6 Claims, 6 Drawing Sheets

205

| INSTRUCTION ID | AREA ID | SAVE DESTINATION ID |
|:---:|:---:|:---:|
| 0 | 1 | 1 |
| 1 | 1,2 | 1 |
| 2 | 1,2,3,4 | 1 |
| 3 | 1 | 2 |
| 4 | 1,2 | 2 |
| 5 | — | — |

| INSTRUCTION ID | AREA ID | SAVE DESTINATION ID |
|---|---|---|
| 0 | 1 | 1 |
| 1 | 1,2 | 1 |
| 2 | 1,2,3,4 | 1 |
| 3 | 1 | 2 |
| 4 | 1,2 | 2 |
| 5 | — | — |

INFORMATION PROCESSING APPARATUS THAT SAVES DATA IN MAIN STORAGE DEVICE AND CONTROL METHOD THEREFOR, AND STORAGE MEDIUM

BACKGROUND OF THE INVENTION

1. Field of the Invention

The present invention relates to an information processing apparatus and a control method therefor, and a storage medium.

2. Description of the Related Art

In a system in which a nonvolatile storage device such as an MRAM (magnetoresistive random access memory) is used, data stored in a main storage device is kept even if the system abnormally ends and energization is terminated, due to unintended power-off or the like.

As techniques relating to MRAMs, there are disclosed techniques in which, in a computer system including an MRAM, at the time of starting up the system, it is determined whether to take a memory dump, and when the memory dump is determined to be taken, the entire information in the MRAM is saved to an area of a program-storage ROM (e.g., refer to Japanese Laid-Open Patent Publication No. 2011-257987).

It is thereby possible, in a system including a conventional nonvolatile main storage device, to obtain memory information at the time of power-off that disappears due to the power-off, from a ROM being a save destination, allowing for achieving improved efficiency of failure analysis.

However, when save processing is performed on the entire data stored in a memory at the time of starting-up a system, a processing time is increased in proportion to the amount of data to be saved, and consequently a time taken to start up the entire system is increased, which is problematic.

SUMMARY OF THE INVENTION

The present invention provides an information processing apparatus that can flexibly change an amount of data to be saved and a controlling method therefor, and a storage medium.

Accordingly, a first aspect of the present invention provides an information processing apparatus that comprises a nonvolatile main storage device and can save data stored in the nonvolatile main storage device, the information processing apparatus comprising a determining unit configured to determine, at a time when the information processing apparatus is started up, whether termination processing has abnormally ended last-time or not, a detecting unit configured to detect an instruction indicating processing that should be performed at the time of the start-up when the determining unit determines that the termination processing has abnormally ended last-time, and a saving unit configured to save, under the instruction detected by the detecting unit, data stored in a save area determined by the instruction from among storage areas of the nonvolatile main storage device, to a save destination determined by the instruction.

Accordingly, a second aspect of the present invention provides a method for controlling an information processing apparatus that comprises a nonvolatile main storage device and can save data stored in the nonvolatile main storage device, the method comprising a determining step of determining, at a time when the information processing apparatus is started up, whether termination processing has abnormally ended last time or not, a detecting step of detecting an instruction indicating processing that should be performed at the time of the start-up when it is determined, in the determining step, that the termination processing has abnormally ended last time, and a saving step of saving, under the instruction detected in the detecting step, data stored in a save area determined by the instruction from among storage areas of the nonvolatile main storage device, to a save destination determined by the instruction.

Accordingly, a third aspect of the present invention provides a computer readable non-transitory storage medium in which a program for causing a computer to perform a method for controlling an information processing apparatus that comprises a nonvolatile main storage device and can save data stored in the nonvolatile main storage device, is stored, the controlling method comprising a determining step of determining, at a time when the information processing apparatus is started up, whether termination processing has abnormally ended last time or not, a detecting step of detecting an instruction indicating processing that should be performed at the time of the start-up when it is determined, in the determining step, that the termination processing has abnormally ended last time, and a saving step of saving, under the instruction detected in the detecting step, data stored in a save area determined by the instruction from among storage areas of the nonvolatile main storage device, to a save destination determined by the instruction.

According to the present invention, under a detected saving instruction, data stored in a save area determined by the saving instruction from among storage areas of a nonvolatile storage device is saved to a save destination determined by the saving instruction, and it is thus possible to flexibly change the amount of data to be saved to a save destination.

Further features of the present invention will become apparent from the following description of exemplary embodiments (with reference to the attached drawings).

DESCRIPTION OF THE EMBODIMENTS

An embodiment of the present invention will be described below in detail with reference to the drawings.

Figure 1:
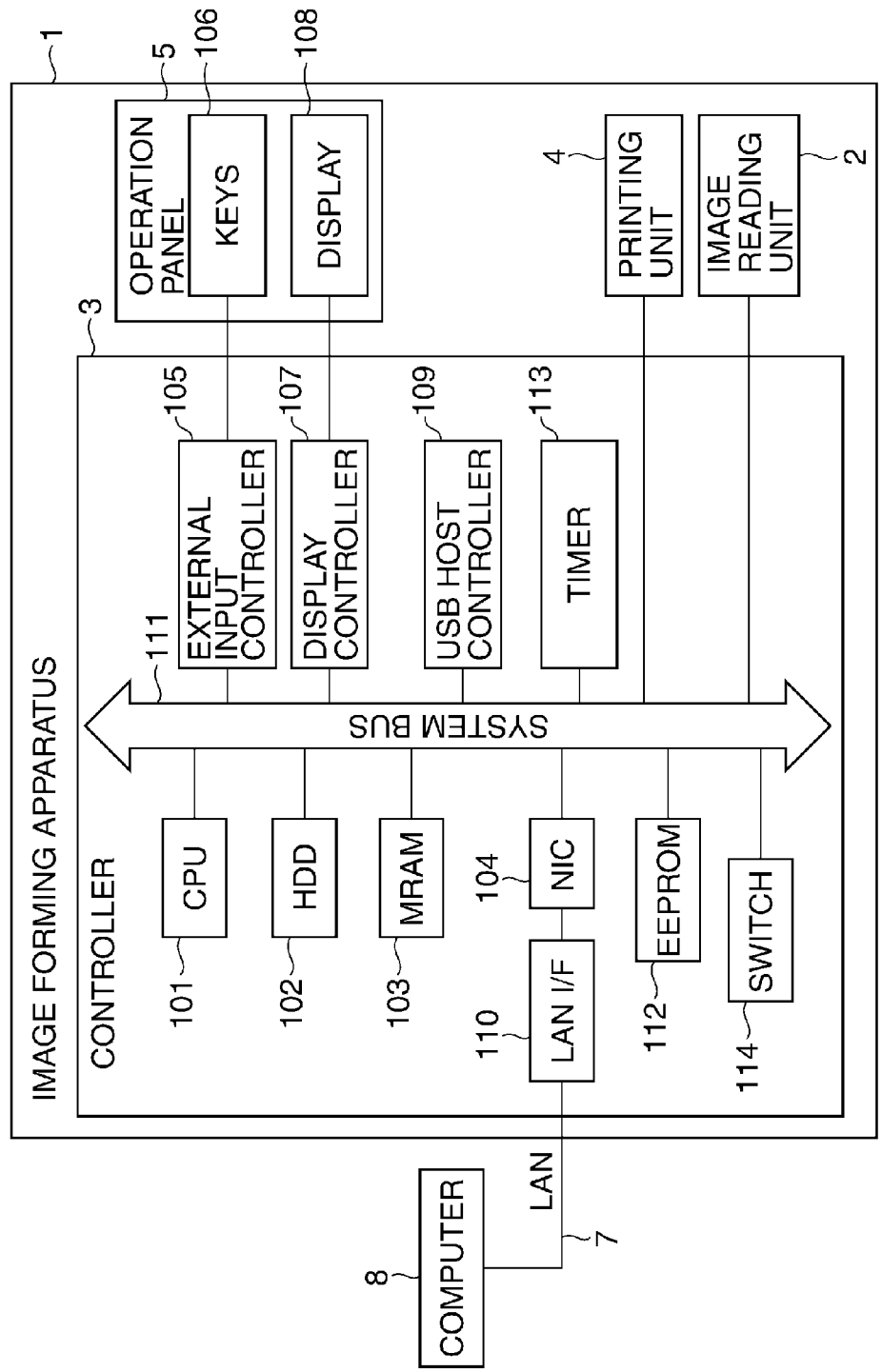
FIG. 1 is a diagram showing the schematic configuration of an image forming apparatus as an information processing apparatus according to an embodiment of the present invention.

FIG. 1 is a diagram showing the schematic configuration of an image forming apparatus 1 as an information processing apparatus according to an embodiment of the present invention.

In FIG. 1, the image forming apparatus 1 includes a controller 3, an image reading unit 2, a printing unit 4, and an operation panel 5.

The controller 3 includes a CPU 101, and controls the entire image forming apparatus 1. The image reading unit 2 generates image data on a document. The printing unit 4 prints out an image represented by the image data onto a recording medium such as paper. The operation panel 5 includes keys 106 including a numeric keypad, and a display 108, accepts operations from a user, and displays various types of information to the user as well. It should be noted that the display 108 is provided with a touch panel, and in the present embodiment, the keys 106 include keys, buttons, and icons displayed on the display 108.

In addition, the controller 3 is constituted by the CPU 101, an HDD 102, an MRAM 103, a NIC (Network Interface Card) 104, an EEPROM 112, a switch 114, an external input controller 105, a display controller 107, a USB host controller 109, and a timer 113, which are connected with one another by a system bus 111.

The CPU 101 executes a various kinds of programs that are stored in the HDD 102 and expanded in the MRAM 103, to control the entire image forming apparatus 1.

The HDD 102 is a nonvolatile storage device, in which OSs (Operating Systems), a boot loader for selecting an OS, firmware for implementing and controlling functions, a file system for managing files efficiently, and a various types of data are stored.

The MRAM 103 is a nonvolatile storage device and a main storage device, and is used as a work area for the CPU 101, and stores the various programs and data as well. It should be noted that, in the present embodiment, although the MRAM is described as the nonvolatile main storage device, other nonvolatile main storage devices such as ReRAMs may be used. In the present embodiment, the data stored in this MRAM 103 is to be saved. In addition, the above-described HDD 102 (the other nonvolatile storage device) is one of save destinations for the data stored in the MRAM 103.

A LAN interface 110 is provided for connecting a LAN cable, and in the present embodiment, is connected to a computer 8 (another information processing apparatus) in which a nonvolatile storage device is provided, via a LAN 7 being a network. The NIC 104 performs a control in conformity with a communication protocol.

The EEPROM 112 is a rewritable and small-capacity nonvolatile storage device, in which setting information on the image forming apparatus 1, and the like are stored. The switch 114 generates a power control instruction for the CPU 101. The CPU 101 performs start-up processing, shutdown processing, and power state transition processing such as processing of transition to a power saving state in response to the power control instruction from the switch 114. The external input controller 105 controls the keys 106. The display controller 107 controls the display 108.

The USB host controller 109 is a controller used for USB connection with an external device, and can connect a device including a USB interface such as a mass storage device and an IC card reader. The USB device (a nonvolatile storage device installed in the information processing apparatus) connected to the above-described USB host controller 109 is one of the save destinations for the data stored in the MRAM 103. The timer 113 includes a secondary buttery, and keeps an elapsed time from a reference time all the time, and measures the elapsed time as well in response to an instruction from the CPU 101.

Figures 2A, 2B:
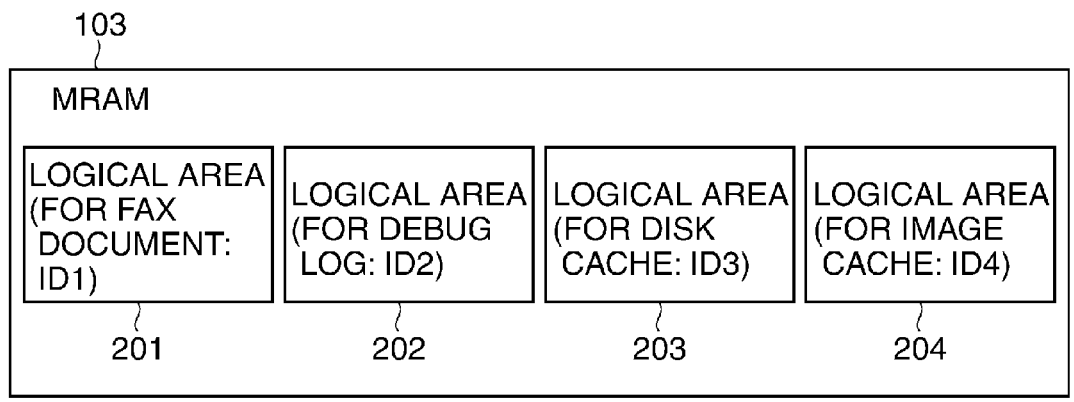
FIG. 2A is a diagram showing logical areas in a storage area of an MRAM.
FIG. 2B is a diagram showing a save processing table.

FIG. 2A is a diagram showing logical areas in a storage area of the MRAM 103, and FIG. 2B is a diagram showing a save processing table 205 in which pieces of save setting information on respective saving instructions are set.

In FIG. 2A, the MRAM 103 is divided into four logical areas 201, 202, 203, and 204. These logical areas 201 to 204 are used as areas in each of which data to be saved is stored. In addition, the logical areas each have an area ID that is allocated in order to distinguish the logical areas.

The logical area 201 is provided for a FAX document, and has an area ID 1. The logical area 202 is provided for a debug log, and has an area ID 2. The logical area 203 is provided for a disk cache, and has an area ID 3. The logical area 204 is provided for an image cache, and has an area ID 4. In addition, each logical area has a start address and a size in the MRAM 103, which are specified beforehand.

Since, in the MRAM 103, the area in which the data to be saved is stored is divided in such a manner, the programs for executing the respective processing use different logical areas for different purposes. For example, a FAX document is stored in the logical area 201, and a system operation log is stored in the logical area 202. It should be noted that the four logical areas are provided by way of an example in the present embodiment, but the present invention is not intended to limit the number of logical areas and further an area other than the above-described logical areas may be provided in the MRAM 103.

In FIG. 2B, the save processing table 205 is constituted by an instruction ID 206, an area ID 207, and a save destination ID 208, and is stored in the HDD 102.

The instruction ID 206 is an ID for identifying a saving instruction. In the present embodiment, a saving instruction corresponds to any one of the keys 106, and the saving instruction can be input by pressing the corresponding key.

For example, "1" on the numeric keypad out of the keys 106 corresponds to an instruction ID 1, and when "1" on the numeric keypad is pressed, a saving instruction having an instruction ID of "1" is input. It should be noted that an instruction ID of "0" indicates that no saving instruction is issued.

In addition, a save setting menu (not shown) is provided in one of setting screens displayed on the display 108 of the image forming apparatus 1. In the save setting menu, a save flag can be set, and the set save flag is stored in the EEPROM 112. For example, when a button "Store an operation log at an abnormal end" (not shown) displayed on the display 108 is pressed, the save flag is set at one and stored in the EEPROM 112. In the present embodiment, the value of this save flag (e.g., zero to five) corresponds to the value of an instruction ID.

The area ID 207 represents the ID of a logical area to be saved. For example, when the instruction ID is "2," the areas having area IDs "1," "2," "3," and "4" are to be areas to be saved. The save destination ID 208 represents a place to which data stored in a logical area to be saved is saved. In the present embodiment, it is assumed that, in a case where the save destination ID is "1," a save destination is the HDD 102, and in a case where the save destination ID is "2," the save destination is the computer 8.

Therefore, for example, when the instruction ID 206 is "1," logical areas to be saved are areas having the area IDs "1" and "2," and pieces of data stored in these logical areas are saved to the HDD 102. In addition, for example, when the instruction ID 206 is "4," logical areas to be saved are areas having the area IDs "1" and "2," and pieces of data stored in these logical areas are saved to the computer 8.

In such a manner, in the present embodiment, a save processing table is provided beforehand which has a plurality of save records in each of which a saving instruction (instruction ID), a logical area (area ID: save area), and a save destination (save destination ID) are associated with one another.

It should be noted that, as described above, the start address and the size of each logical area in the present embodiment are specified beforehand, but the start address and the size of each logical area may be stored in the save processing table 205 beforehand, and logical areas to be saved may be defined by referring to the save processing table 205.

Figure 3:
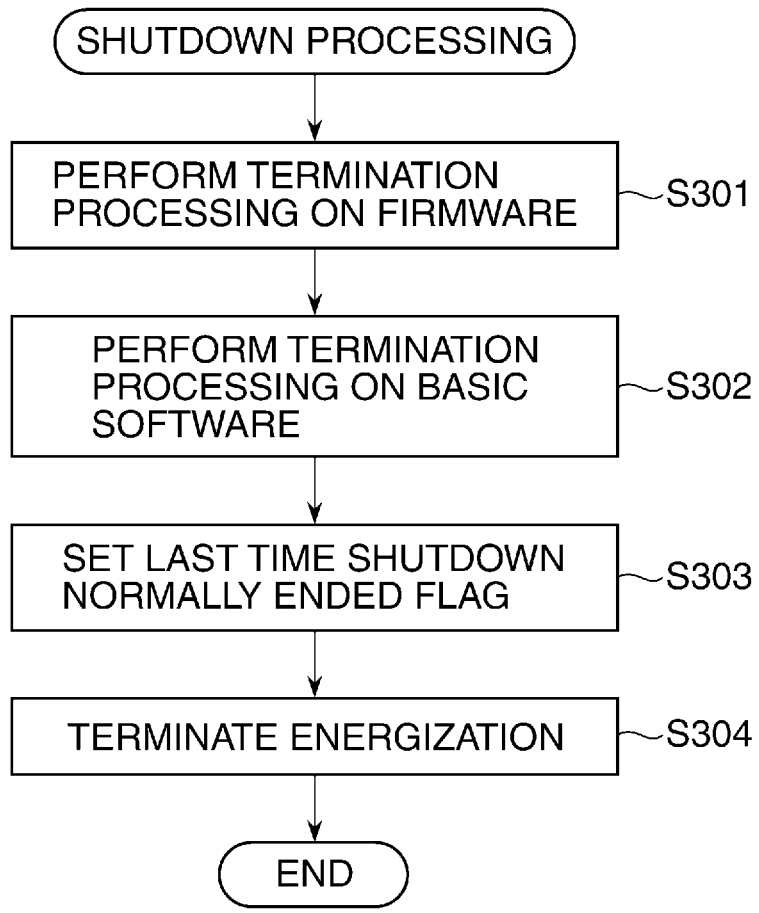
FIG. 3 is a flow chart showing a procedure of shutdown processing of the image forming apparatus, which is performed by a CPU in FIG. 1.

FIG. 3 is a flow chart showing a procedure of shutdown processing of the image forming apparatus 1, which is performed by the CPU 101 in FIG. 1.

The CPU 101 performs termination processing on pieces of firmware operating in the image forming apparatus 1 (step S301). Specifically, processing such as writing out files or setting values stored only in the MRAM 103 to the HDD 102 is performed.

Next, the CPU 101 performs termination processing on basic software (step S302). Specifically, registers are set for various devices such as the HDD 102, the image reading unit 2, the printing unit 4, and the NIC 104, so as to bring the image forming apparatus 1 into a shutdown-enabled state.

Then, the CPU 101 sets a last time shutdown normally ended flag to the EEPROM 112 (step S303), sets the registers of the switch 114, terminates energization of the image forming apparatus 1 (step S304), and ends this processing.

In the step 303, when the last time shutdown normally ended flag is set to the EEPROM 112, the CPU 101 can recognize, at the next start-up, that the last-time shutdown is normally ended. In contrast, when power-off occurs without performing the step S303, the last time shutdown normally ended flag is not set, and thus the CPU 101 can detect an abnormal end in the last-time shutdown, at the next start-up.

Figure 4:
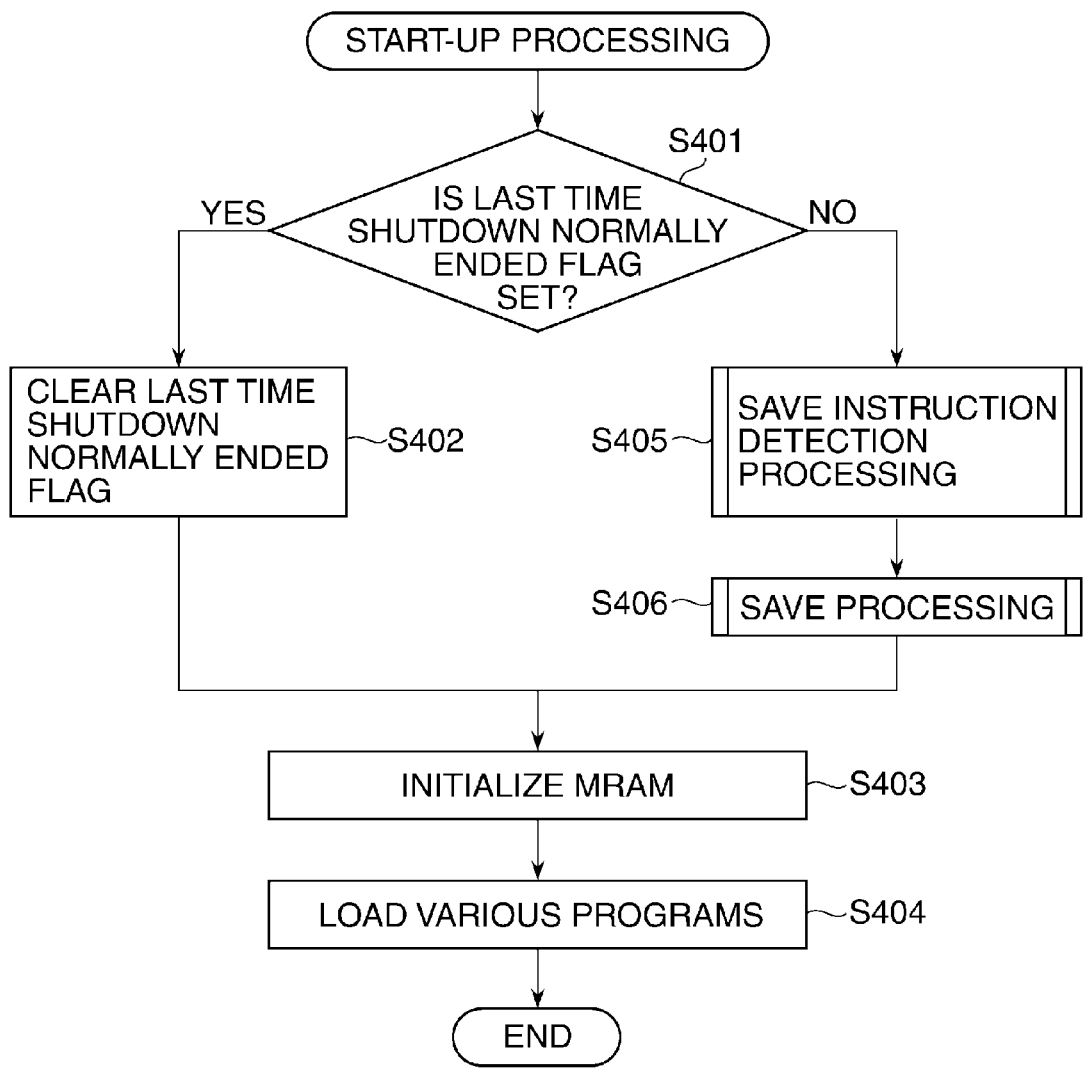
FIG. 4 is a flow chart showing a procedure of start-up processing of the image forming apparatus, which is performed by the CPU in FIG. 1.

FIG. 4 is a flow chart showing a procedure of start-up processing of the image forming apparatus 1, which is performed by the CPU 101 in FIG. 1.

The CPU 101 determines whether or not the last time shutdown normally ended flag is set to the EEPROM 112 (step S401).

When the result of the determination in the step S401 is that the last time shutdown normally ended flag is set (YES in the step S401), the CPU 101 clears the last time shutdown normally ended flag (step S402), and proceeds to step S403.

In contrast, when the result of the determination in the step S401 is that the last time shutdown normally ended flag is not set (NO in the step S401), the CPU 101 performs saving instruction detection processing of detecting a saving instruction (step S405: detecting unit), and performs save processing under the detected saving instruction (step S406: saving unit).

Next, the CPU 101 initializes the MRAM 103 (step S403). Here, the CPU 101 initializes the MRAM 103 by writing a random byte sequence across the entire area in the MRAM 103 or by setting a dedicated reset register if the CPU 101 includes the register.

Next, the CPU 101 loads various programs such as basic software and firmware from the HDD 102 to the MRAM 103 (step S404), and starts up the image forming apparatus 1 under the loaded program.

Figure 5:
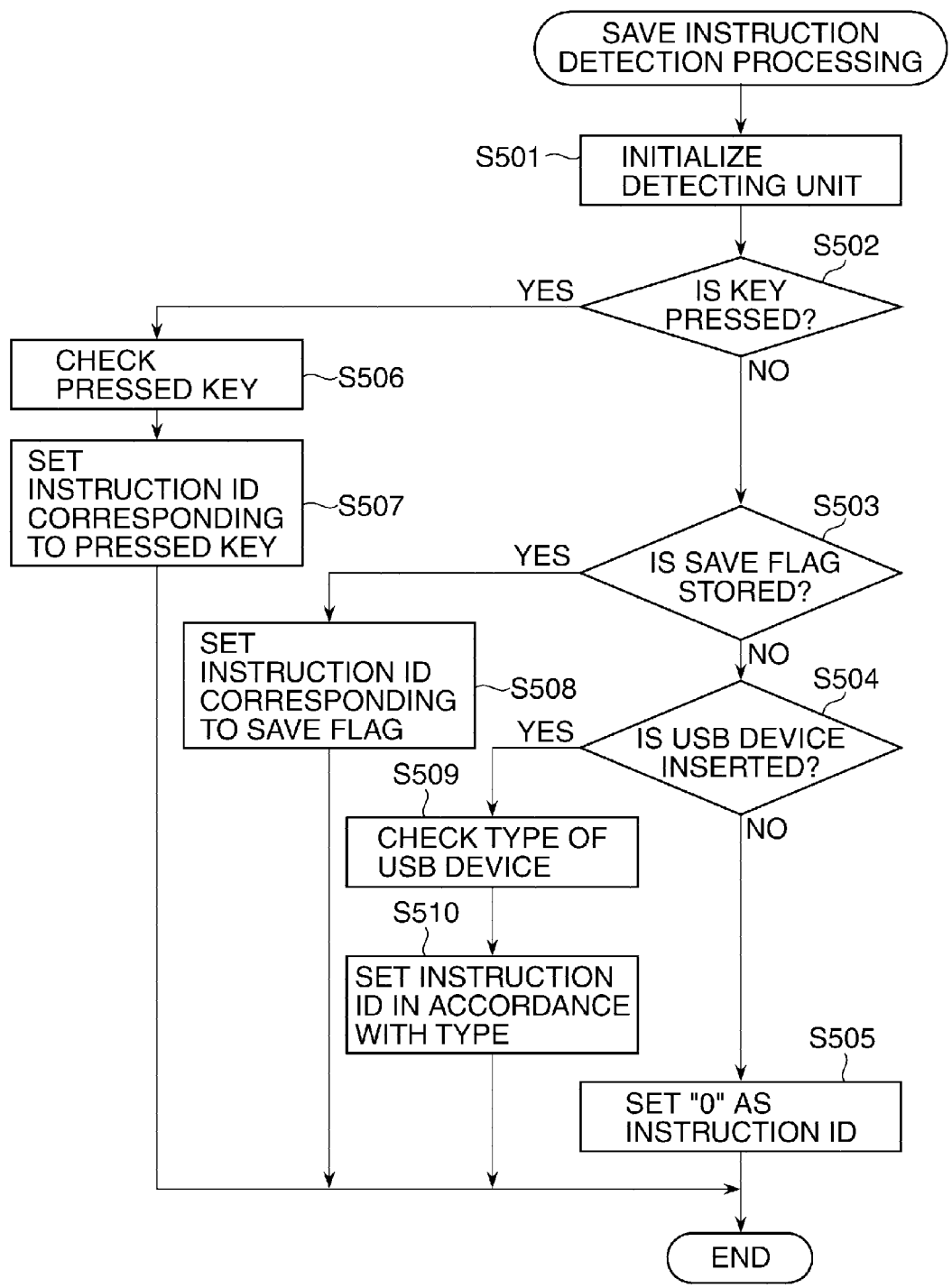
FIG. 5 is a flow chart showing a procedure of saving instruction detection processing in step S405 in FIG. 4.

FIG. 5 is a flow chart showing a procedure of saving instruction detection processing in the step S405 in FIG. 4.

In FIG. 5, the CPU 101 initializes a detecting unit (step S501). Specifically, the CPU 101 sets the registers of the external input controller 105 and the USB host controller 109. It is thereby possible to detect a saving instruction in the subsequent processing.

Next, the CPU 101 determines whether any one of the keys 106 is pressed or not (step S502). When the result of the determination in the step S502 is that any one of the keys is pressed (YES in the step S502), the CPU 101 checks the pressed key (step S506), and sets the instruction ID 206 corresponding to the pressed key to the MRAM 103 (step S507), and ends this processing. For example, when "1" on the numeric keypad is pressed, "1" is set to the MRAM 103 as the instruction ID 206. It should be noted that, not only in the step S507, the instruction ID 206 set in this processing is stored in the MRAM 103.

Returning to the step S502, when the result of the determination in the step S502 is that none of the keys is pressed (NO in the step S502), the CPU 101 determines whether or not the above-described save flag is stored in the EEPROM 112 (step S503).

When the result of the determination in the step S503 is that the save flag is stored in the EEPROM 112 (YES in the step S503), the CPU 101 sets the instruction ID corresponding to the save flag to the MRAM 103 (step S508), and ends this processing. For example, when the save flag of one is stored in the EEPROM 112, "1" is set to the MRAM 103 as the instruction ID 206.

In contrast, when the result of the determination in the step S503 is that the save flag is not stored in the EEPROM 112 (NO in the step S503), the CPU 101 determines whether or not a USB device is inserted into the USB host controller 109 (step S504).

When the result of the determination in the step S504 is that a USB device is inserted into the USB host controller 109 (YES in the step S504), the CPU 101 checks the type of the USB device (step S509). Specifically, the CPU 101 reads out a vendor ID and a product ID of the USB device, and checks on whether or not they correspond to known IDs.

Then, the CPU 101 sets the instruction ID that is set beforehand in accordance with the type of the checked USB device, to the MRAM 103 (step S510), and ends this processing. If the type of the USB device does not correspond to the known IDs, the CPU 101 sets "0" as the instruction ID. In addition, when a plurality of USB devices can be inserted, the instruction ID may be set to each of the inserted USB devices.

In contrast, when the result of the determination in the step S504 is that no USB device is inserted (NO in the step S504), the CPU 101 sets "0" as the instruction ID considering that no saving instruction is issued (step S505), and ends this processing.

In such a manner, in the present embodiment, in the operation panel 5 including the keys 106 for accepting operations from a user, a saving instruction is detected with the saving instruction based on a key pressed by the user (steps S502, 506, and 507), or with a save flag provided beforehand for indicating the saving instruction (steps S503 and 508).

Figure 6:
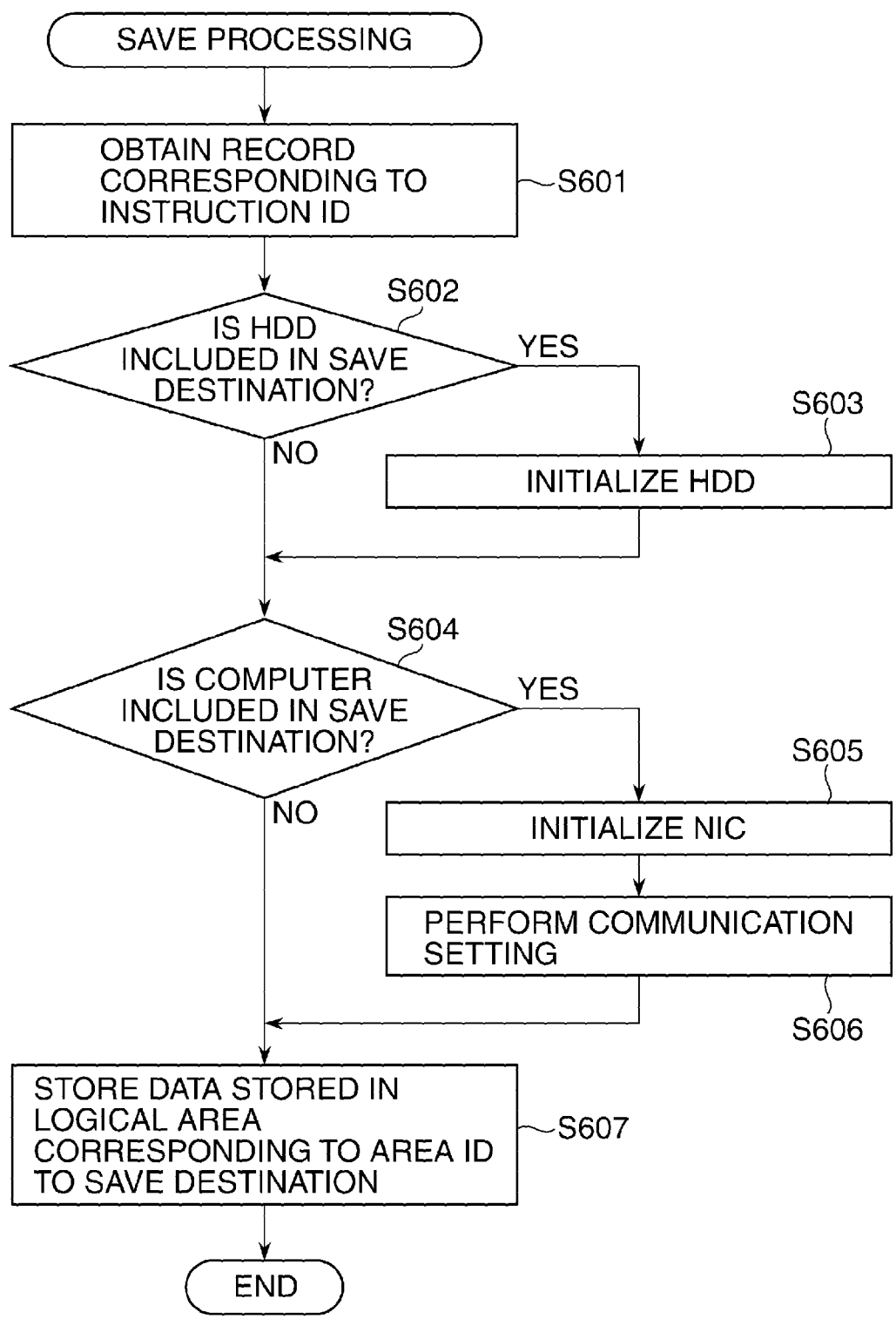
FIG. 6 is a flow chart showing a procedure of save processing in step S406 in FIG. 4.

FIG. 6 is a flow chart showing a procedure of save processing in the step S406 in FIG. 4.

In FIG. 6, the CPU 101 obtains a record corresponding to the instruction ID 206 that is set to the MRAM 103 through the saving instruction detection processing, from the save processing table 205 (step S601). Next, the CPU 101 refers to the save destination ID 208 of the obtained record and determines whether or not "1," namely the HDD 102 is included in the save destination ID 208 (step S602).

When the result of the determination in the step S602 is that the HDD 102 is included in the save destination (YES in the step S602), the CPU 101 initializes the HDD 102 such that data stored in a logical area to be saved can be saved (step S603), and proceeds to step S604. In this initialization, appropriate register settings and initialization processing on a file system are performed.

In contrast, when the result of the determination in the step S602 is that the HDD 102 is not included in the save destination (NO in the step S602), the CPU 101 determines whether or not "2," namely the computer 8 is included in the save destination ID 208 (step S604).

When the result of the determination in the step S604 is that the computer 8 is included in the save destination (YES in the step S604), the CPU 101 initializes the NIC 104 (step S605), performs communication settings (step S606), and proceeds to step S607. In the initialization of the NIC 104 in the step S605, appropriate register settings or the like are performed, and in the communication setting in the step S606, settings relating to communication processing such as an IP address, or the like are performed.

In contrast, when the result of the determination in the step S604 is that the computer 8 is not included in the save destination (NO in the step S604), the CPU 101 refers to the area ID 207 of the obtained record, and saves data stored in the logical area corresponding to the area ID 207, to the save destination indicated by the save destination ID 208 (step S607), and ends this processing.

According to the present embodiment described above, data stored in a logical area specified by a saving instruction among the storage areas of the MRAM 103 is saved under a detected saving instruction (steps S602 and 604), and it is thus possible to flexibly change the amount of data to be saved.

Since the limit of data to be saved can be thereby changed, it is possible to restrain a time taken for the save processing to be performed, which can in turn limit a time delay occurring in the save processing.

In addition, a saving instruction can also be input with the operation panel 5 and can be set beforehand as well to the EEPROM 112, as a save flag. Setting a save flag dispenses with the operation on the operation panel 5 at the time of system start-up.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-241100, filed Nov. 21, 2013, which is hereby incorporated by reference wherein in its entirety.

What is claimed is:

1. An information processing apparatus that comprises a nonvolatile main storage device and can save data stored in the nonvolatile main storage device, the information processing apparatus comprising:
   a determining unit configured to determine, at a time when the information processing apparatus is started up, whether termination processing has abnormally ended last-time or not;
   a detecting unit configured to detect an instruction indicating processing that should be performed at the time of the start-up when said determining unit determines that the termination processing has abnormally ended last-time; and
   a saving unit configured to save, under the instruction detected by said detecting unit, data stored in a save area determined by the instruction from among storage areas of the nonvolatile main storage device, to a save destination determined by the instruction.

2. The information processing apparatus according to claim 1, further comprising a save processing table having a plurality of save records, each of which has the instruction, the save area, and the save destination, which are associated with one another beforehand,
   wherein said saving unit saves, using the save processing table, data stored in a save area specified by a save record corresponding to the instruction, to a save destination associated with the instruction in the save record.

3. The information processing apparatus according to claim 2, further comprising:
   an operation unit including keys configured to accept operations from a user; and
   a storing unit configured to store a save flag indicating the instruction beforehand,
   wherein said detecting unit detects the instruction on a basis of the save flag, or whether or not the user presses the key on said operation unit.

4. The information processing apparatus according to claim 1, wherein the save destination is at least one of another nonvolatile storage device provided in the information processing apparatus, a nonvolatile storage device provided in another information processing apparatus connected via a network, and a nonvolatile storage device installed in the information processing apparatus.

5. A method for controlling an information processing apparatus that comprises a nonvolatile main storage device and can save data stored in the nonvolatile main storage device, the method comprising:
- a determining step of determining, at a time when the information processing apparatus is started up, whether termination processing has abnormally ended last time or not;
- a detecting step of detecting an instruction indicating processing that should be performed at the time of the start-up when it is determined, in said determining step, that the termination processing has abnormally ended last time; and
- a saving step of saving, under the instruction detected in said detecting step, data stored in a save area determined by the instruction from among storage areas of the nonvolatile main storage device, to a save destination determined by the instruction.

6. A computer readable non-transitory storage medium in which a program for causing a computer to perform a method for controlling an information processing apparatus that comprises a nonvolatile main storage device and can save data stored in the nonvolatile main storage device, is stored, the controlling method comprising:
- a determining step of determining, at a time when the information processing apparatus is started up, whether termination processing has abnormally ended last time or not;
- a detecting step of detecting an instruction indicating processing that should be performed at the time of the start-up when it is determined, in said determining step, that the termination processing has abnormally ended last time; and
- a saving step of saving, under the instruction detected in said detecting step, data stored in a save area determined by the instruction from among storage areas of the nonvolatile main storage device, to a save destination determined by the instruction.

* * * * *